(12) United States Patent
Lo et al.

(10) Patent No.: US 8,013,964 B2
(45) Date of Patent: Sep. 6, 2011

(54) LIQUID CRYSTAL DISPLAY DEVICE

(75) Inventors: Cheng Lo, Hsin-Chu (TW); Yung-Lun Lin, Hsin-Chu (TW); Ching-Sheng Cheng, Hsin-Chu (TW); Chih-Jen Hu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 312 days.

(21) Appl. No.: 12/494,264

(22) Filed: Jun. 29, 2009

(65) Prior Publication Data
US 2010/0149461 A1   Jun. 17, 2010

(30) Foreign Application Priority Data

Dec. 11, 2008   (TW) ................................ 97148206 A

(51) Int. Cl.
G02F 1/1335   (2006.01)
(52) U.S. Cl. ........................................ 349/119; 349/102

(58) Field of Classification Search .................. None
See application file for complete search history.

(56) References Cited

U.S. PATENT DOCUMENTS

| 4,884,876 A * | 12/1989 | Lipton et al. ................. 349/33 |
| 6,977,700 B2 | 12/2005 | Uesaka et al. |
| 2001/0024257 A1 * | 9/2001 | Kubo et al. .................. 349/138 |

FOREIGN PATENT DOCUMENTS

| TW | I238913 | 9/2005 |
| TW | 200730929 | 8/2007 |

* cited by examiner

*Primary Examiner* — Lucy Chien
(74) *Attorney, Agent, or Firm* — Winston Hsu; Scott Margo

(57) ABSTRACT

A liquid crystal display device uses a first quarter-wave retardation film and a hybrid aligned nematic film to reduce light leakage in dark state for reaching high contrast ratio, and uses multiple-gamma IC to provide different gamma-curve signals for pixels of different colors to solve color shift problem. In addition, the liquid crystal display device may use a second quarter-wave retardation film to reduce light leakage when viewed in a wide angle so as to further provide higher contrast ratio.

13 Claims, 13 Drawing Sheets

LIQUID CRYSTAL DISPLAY DEVICE

BACKGROUND OF THE INVENTION

1. Field of the Invention

The present invention relates to a liquid crystal display (LCD) device, and more particularly, to an LCD device having advantages of high contrast ratio, wide view angle and low color washout.

2. Description of the Prior Art

Since electrically controlled birefringence (ECB) LCD devices have advantages, such as higher aperture ratio and simple manufacturing process, the ECB LCD devices have become one of the widely prevailing LCDs nowadays. With reference to FIG. 1 and FIG. 2, FIG. 1 and FIG. 2 are schematic diagrams of a conventional ECB LCD panel. FIG. 1 is a schematic diagram illustrating a conventional ECB LCD panel in/under the bright state, and FIG. 2 is a schematic diagram illustrating a conventional ECB LCD panel in/under the dark state. The ECB LCD panel 10 is a normally white LCD panel. The ECB LCD panel includes two substrates 12, 14, and liquid crystal molecules 16 sealed therebetween. The liquid crystal molecules 16 are arranged along the rubbing direction on the surfaces of the substrates 12, 14. As illustrated in FIG. 1, when no voltage is applied between the two substrates 12, 14, the liquid crystal molecules 16 between two substrates 12, 14 are lying along the rubbing direction. In such a case, a polarized light, which enters the ECB LCD panel 10 from the back of the substrate 12 and penetrates through the liquid crystal molecules 16, can have a maximum phase difference. Consequently, the ECB LCD panel 10 displays the bright state. As illustrated in FIG. 2, when a dark state voltage ($V_{dark}$) is applied between the two substrates 12, 14, the liquid crystal molecules 16 is driven and rotated due to the electric field. In such a case, a polarized light, which enters the ECB LCD panel 10 from the back of the substrate 12 and penetrates through the liquid crystal molecules 16, can have a smaller phase difference. Consequently, the ECB LCD displays the dark state. However, the liquid crystal molecules 16 adjacent to the surfaces of the two substrates 12, 14 have a strong anchoring force due to the rubbing effect on the surfaces of two substrates 12, 14. Consequently, when a voltage is applied between the two substrates 12, 14, the liquid crystal molecules 16 adjacent to two substrates 12, 14 remain unaffected and are arranged along the originally rubbing direction. Under such condition, the liquid crystal molecules 16 adjacent to the surfaces of the substrates 12, 14 will influence the phase difference of the passing polarized light. As a result, when images are displayed in the dark state, viewers may see undesired light leakage from a wide angle. Furthermore, the contrast ratio of the LCD panel is also influenced.

In addition, the liquid crystal molecules 16 have dispersion characteristics. Therefore, the lights with different wavelengths have different phase differences when penetrating through the liquid crystal molecules 16. Consequently, the color washout problem occurs. For instance, since a blue light has a maximum phase difference when penetrating through the liquid crystal molecules 16. Therefore, when a black image is displayed, an excessively blue image often appears.

SUMMARY OF THE INVENTION

It is therefore one of the objects of the present invention is to provide an LCD device to increase the contrast ratio and solve the color washout problem.

To achieve the above-mentioned purpose, the present invention provides an LCD device including an LCD panel, a first polarizer, a first quarter-wave retardation film, a hybrid aligned nematic film, a second polarizer and a multiple-gamma IC. The LCD panel includes a light incident surface, a light emitting surface and a slow axis. The first polarizer disposed on one side of the light incident surface of the LCD panel has a first transmissive axis. The first quarter-wave retardation film disposed between the LCD panel and the first polarizer has a slow axis. The hybrid aligned nematic film is disposed between the LCD panel and the first quarter-wave retardation film, and the hybrid aligned nematic film has a slow axis. The second polarizer is disposed on one side of the light emitting surface of the LCD panel, and the second polarizer has a second transmissive axis. The multiple-gamma IC provides different gamma-curve signals respectively for different color pixels of the LCD panel. The first transmissive axis of the first polarizer is substantially perpendicular to the second transmissive axis of the second polarizer. The slow axis of the first quarter-wave retardation film is substantially perpendicular to the slow axis of the hybrid aligned nematic film. The slow axis of the hybrid aligned nematic film is substantially parallel to the slow axis of the LCD panel. The included angle between the slow axis of the first quarter-wave retardation film and the first transmissive axis of the first polarizer is greater than 0° and smaller than 90°.

By virtue of the arrangement of the first quarter-wave retardation film and the hybrid aligned nematic film, the LCD device of the present invention can reduce the undesired light leakage in/under the dark state so as to obtain a higher contrast ratio. In addition, the adopted multiple-gamma IC can provide different gamma-curve signals respectively for different color pixels of the LCD panel so as to solve the color washout problem.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention, preferred embodiments will be detailed as follows. The preferred embodiments of the present invention are illustrated in the accompanying drawings with numbered elements to elaborate the contents and effects to be achieved.

Figure 1:
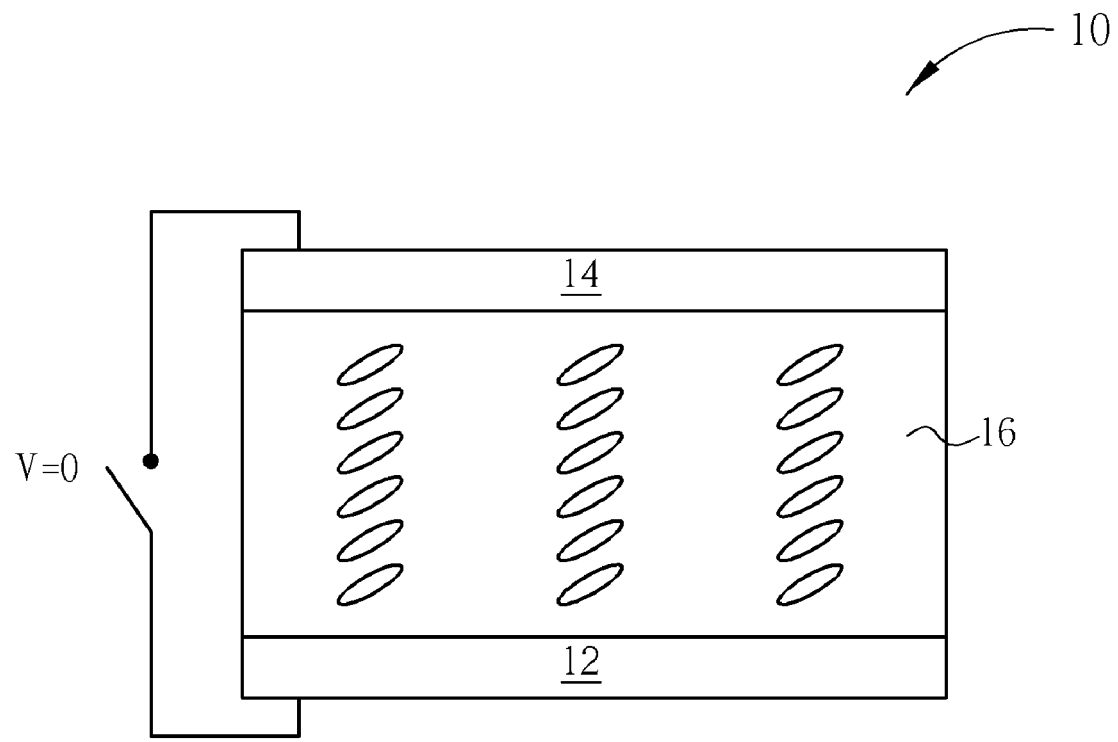
FIG. 1 is a schematic diagram illustrating a conventional ECB LCD panel in/under the bright state.
Figure 2:
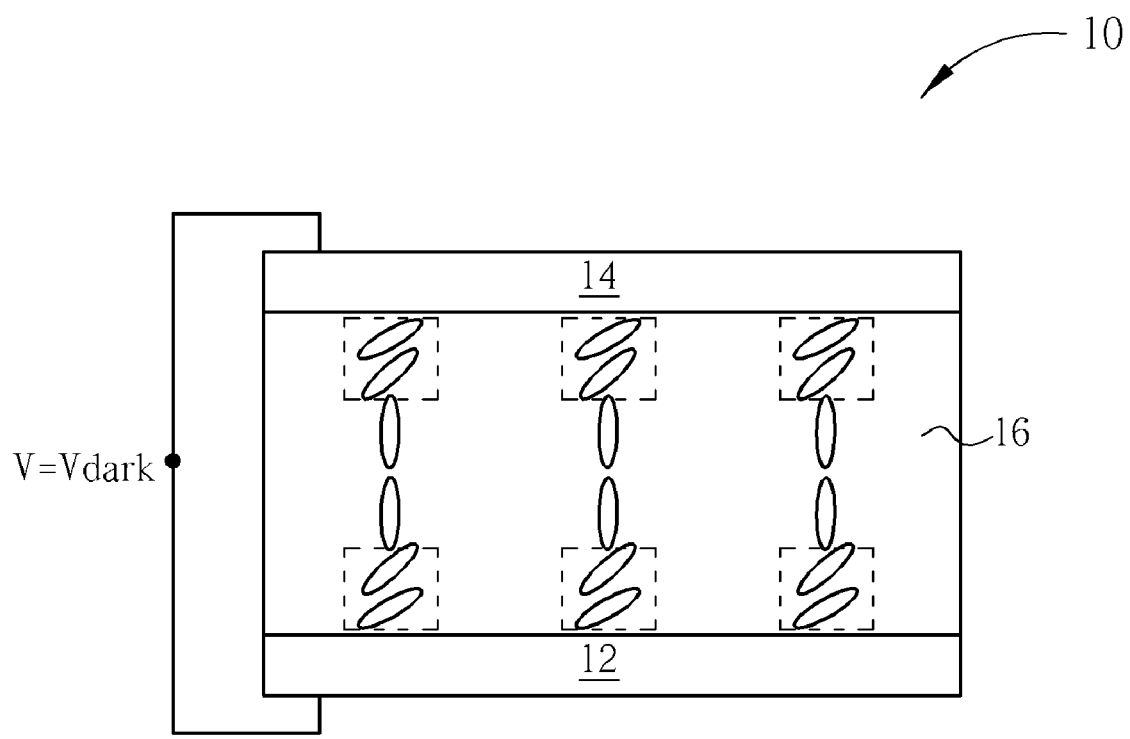
FIG. 2 is a schematic diagram illustrating a conventional ECB LCD panel in/under the dark state.
Figure 3:
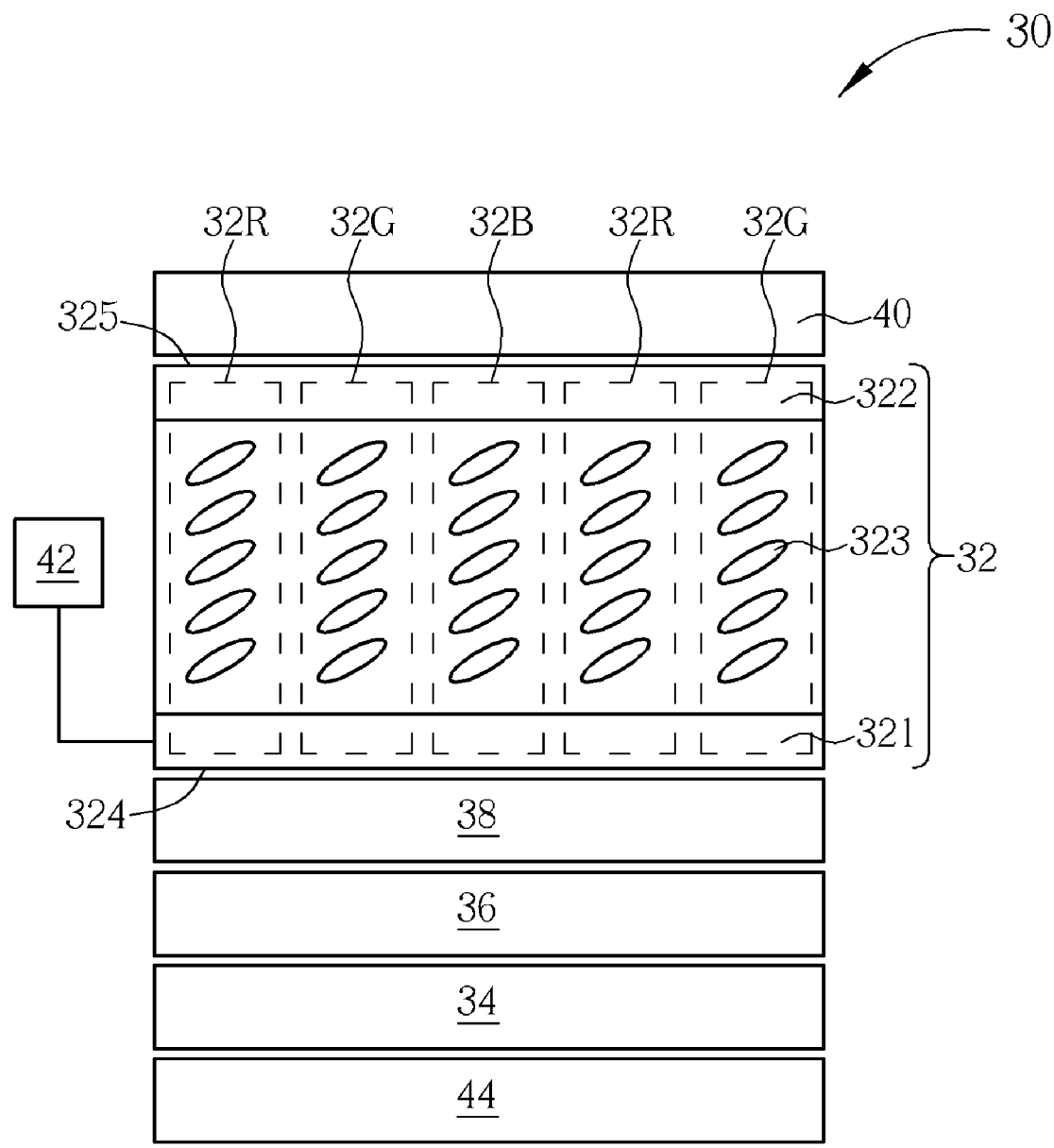
FIG. 3 is a cross-sectional schematic diagram illustrating an LCD device of the present embodiment.
Figure 4:
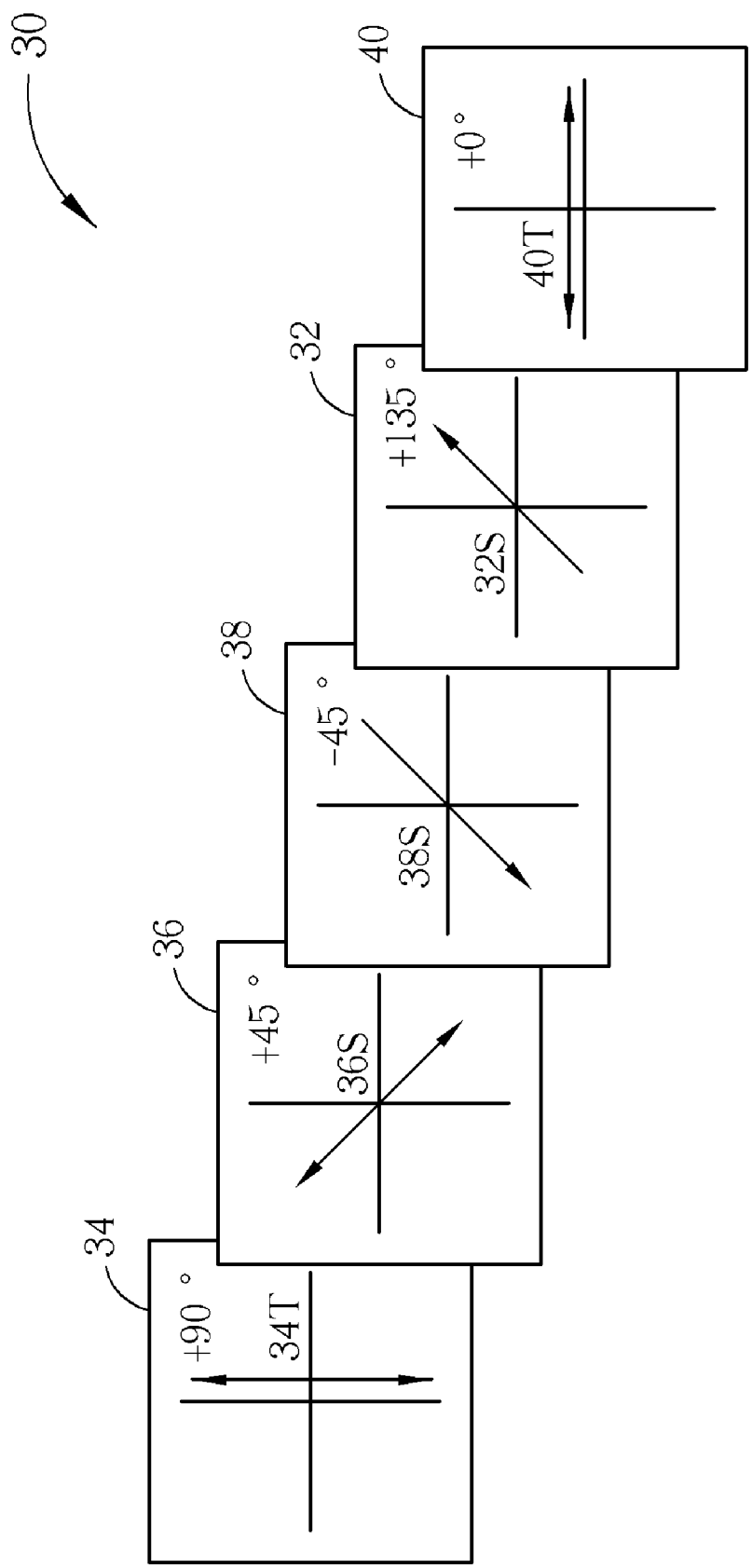
FIG. 4 is a schematic diagram illustrating the relationship of the slow axis or the transmissive axis direction of each of the films of an LCD device of the present embodiment.

With reference to FIG. 3 and FIG. 4, FIG. 3 and FIG. 4 are schematic diagrams illustrating a preferred embodiment of an LCD device of the present invention. FIG. 3 is a cross-sectional schematic diagram illustrating an LCD device of the present embodiment. FIG. 4 is a schematic diagram illustrating the relationship of the slow axis or the transmissive axis direction of each of the films of an LCD device of the present embodiment. As illustrated in FIG. 3, the LCD device 30 of the present embodiment includes an LCD panel 32, a first polarizer 34, a first quarter-wave retardation film 36, a hybrid aligned nematic film 38, a second polarizer 40, a multiple-gamma IC 42 and a backlight module 44. The LCD panel 32 includes a thin-film transistor substrate 321, a color filter substrate 322 and liquid crystal molecules 323 sealed between the thin-film transistor substrate 321 and the color filter substrate 322. One surface of the thin-film transistor substrate 321 facing the backlight module 44 is a light incident surface 324, and one surface of the color filter substrate 322 opposite to the thin-film transistor substrate 321 is a light emitting surface 325. Besides, the LCD panel 32 includes a plurality of red pixels 32R, a plurality of green pixels 32G, and a plurality of blue pixels 32B so as to respectively display red, green and blue images. The first polarizer 34 is disposed on one side of the light incident surface 324 of the LCD panel 32. The first quarter-wave retardation film 36 is disposed between the liquid crystal display panel 32 and the first polarizer 34. The hybrid aligned nematic film 38 is disposed between the LCD panel 32 and the first quarter-wave retardation film 36. The second polarizer 40 is disposed on one side of the light emitting surface 325 of the LCD panel 32. In addition, the multiple-gamma IC 42 of the present embodiment is a 3-gamma IC, for example, respectively corresponding to the red pixels 32R, green pixels 32G and blue pixels 32B of the LCD panel 32 so as to provide different gamma-curve signals respectively for the red pixels 32R, green pixels 32G and blue pixels 32B of the LCD panel 32. Additionally, the driving technique of the 3-gamma IC is illustrated in Taiwan patent No. 473628, and the contents of driving technique are also integrated into the detailed description of the present invention.

As illustrated in FIG. 4, the LCD panel 32 has a slow axis 32S, and the first polarizer 34 has a first transmissive axis 34T. The first quarter-wave retardation film 36 has a slow axis 36S, and the hybrid aligned nematic film 38 has a slow axis 38S. The second polarizer 40 has a second transmissive axis 40T. In the present embodiment, the first transmissive axis 34T of the first polarizer 34 is substantially perpendicular to the second transmissive axis 40T of the second polarizer 40. The slow axis 36S of the first quarter-wave retardation film 36 is substantially perpendicular to the slow axis 38S of the hybrid aligned nematic film 38. The slow axis 38S of the hybrid aligned nematic film 38 is substantially parallel to the slow axis 32 of the LCD panel 32. However, the direction of the slow axis 38S is opposite to that of the slow axis 32. The included angle between the slow axis 36S of the first quarter-wave retardation film 36 and the first transmissive axis 34T of the first polarizer 34 is greater than about 0° and smaller than about 90°. For instance, when the direction of the second transmissive axis 40T of the second polarizer 40 is regarded as 0° and the clockwise direction is set as a forward direction, each of the directions of the slow axis or transmissive axis of other films can be expressed as following angles: the direction of the slow axis 36S of the first quarter-wave retardation film 36 is greater than about 0° but smaller than about 90°, such as about 45° but not limited; the direction of the slow axis 38S of the hybrid aligned nematic film 38 is about −45°, which can be adjusted moderately. The direction of the slow axis 32S of the LCD panel 32 is about 135°, which can be adjusted moderately; the direction of the first transmissive axis 34T of the first polarizer 34 is about 90°.

Figure 5A:
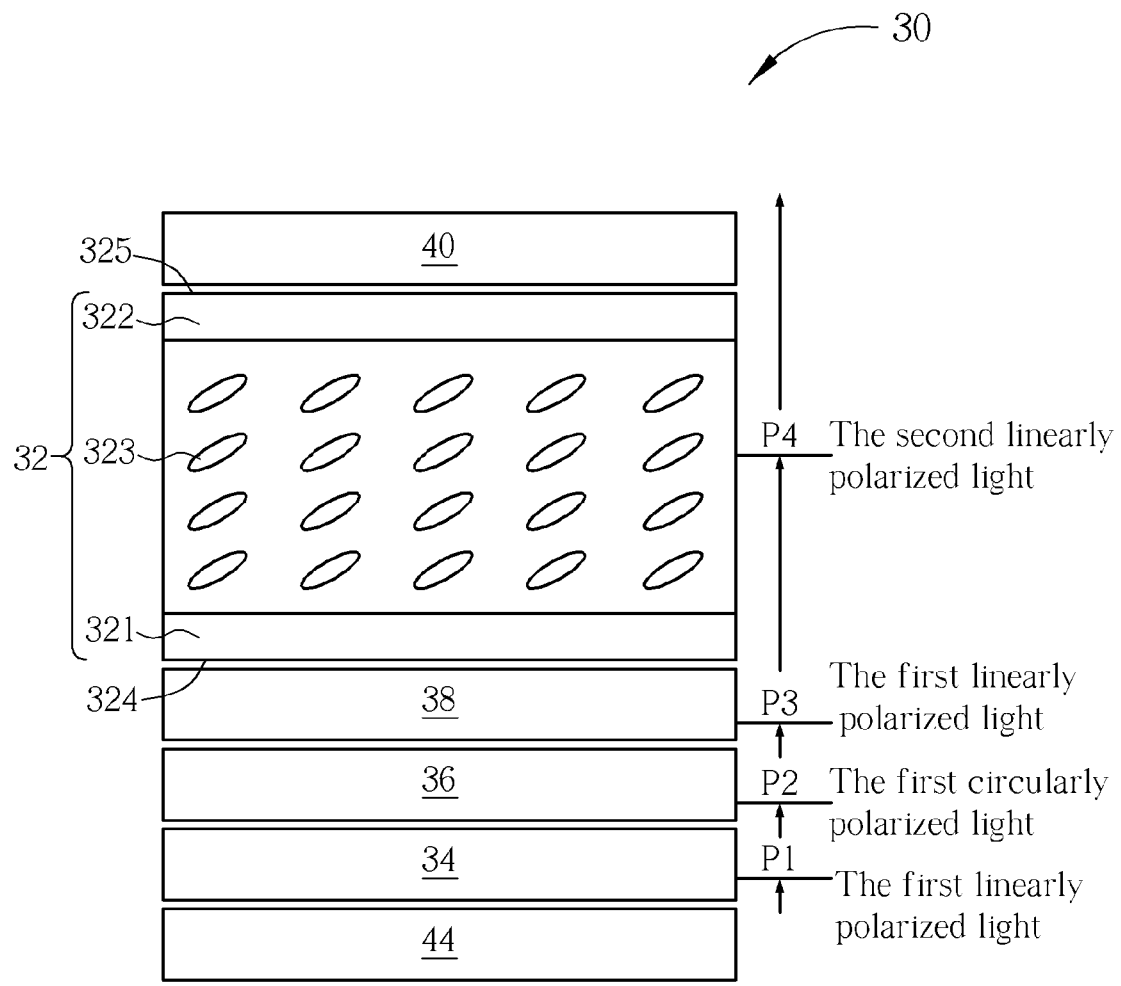
FIG. 5A is a schematic diagram illustrating the LCD panel of present embodiment in the bright state.
Figure 5B:
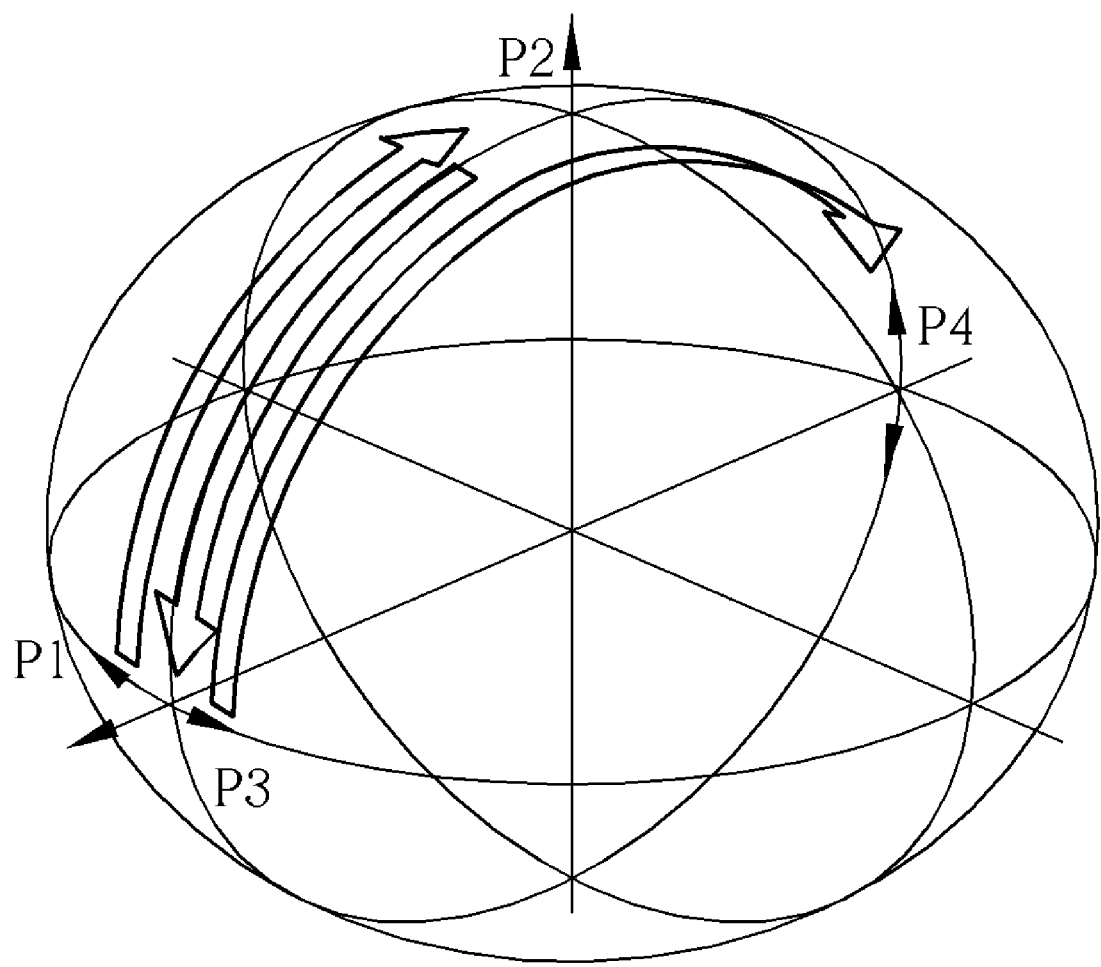
FIG. 5B is a poincare sphere illustrating the variation of light polarity of an LCD panel in the bright state.
Figure 6A:
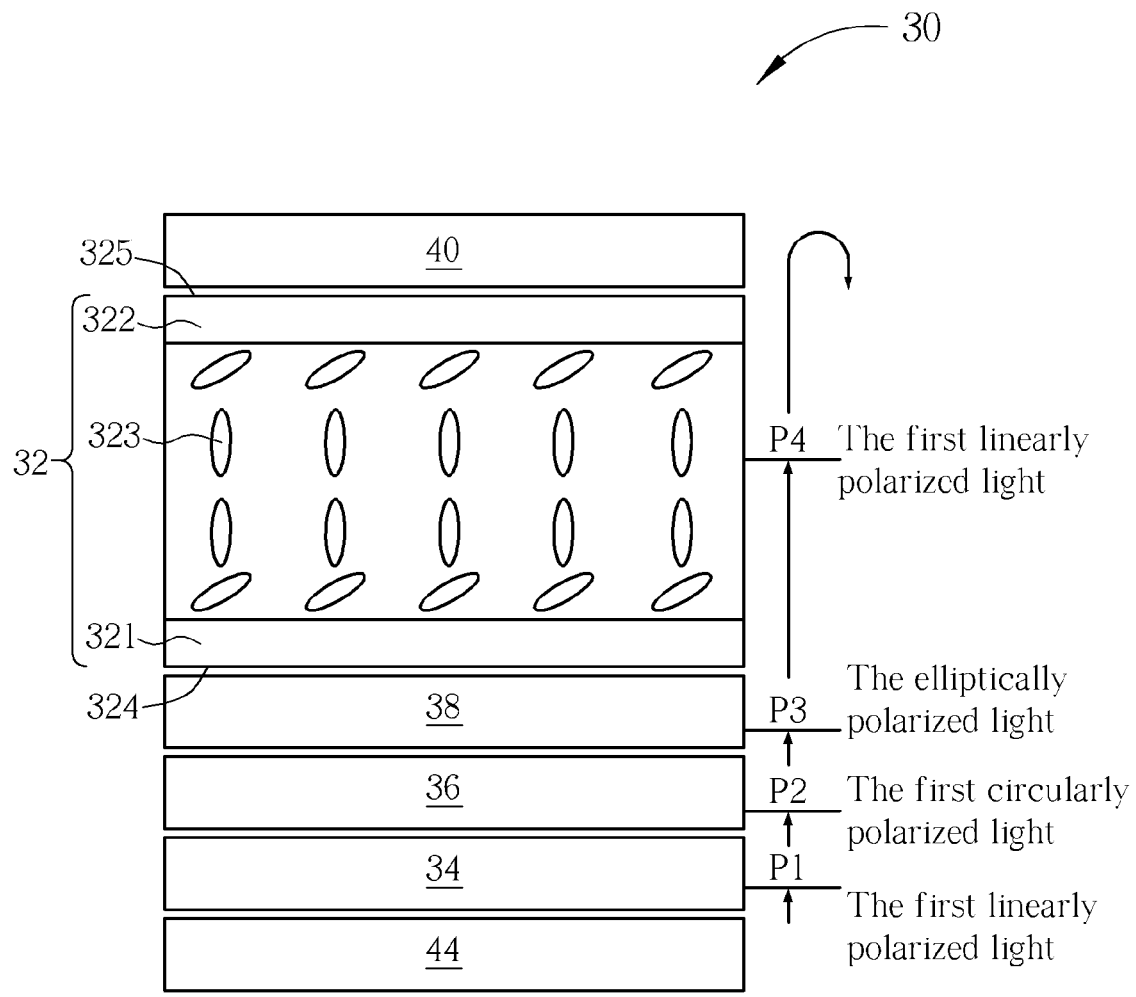
FIG. 6A is a schematic diagram illustrating the LCD panel of the present embodiment in the dark state.
Figure 6B:
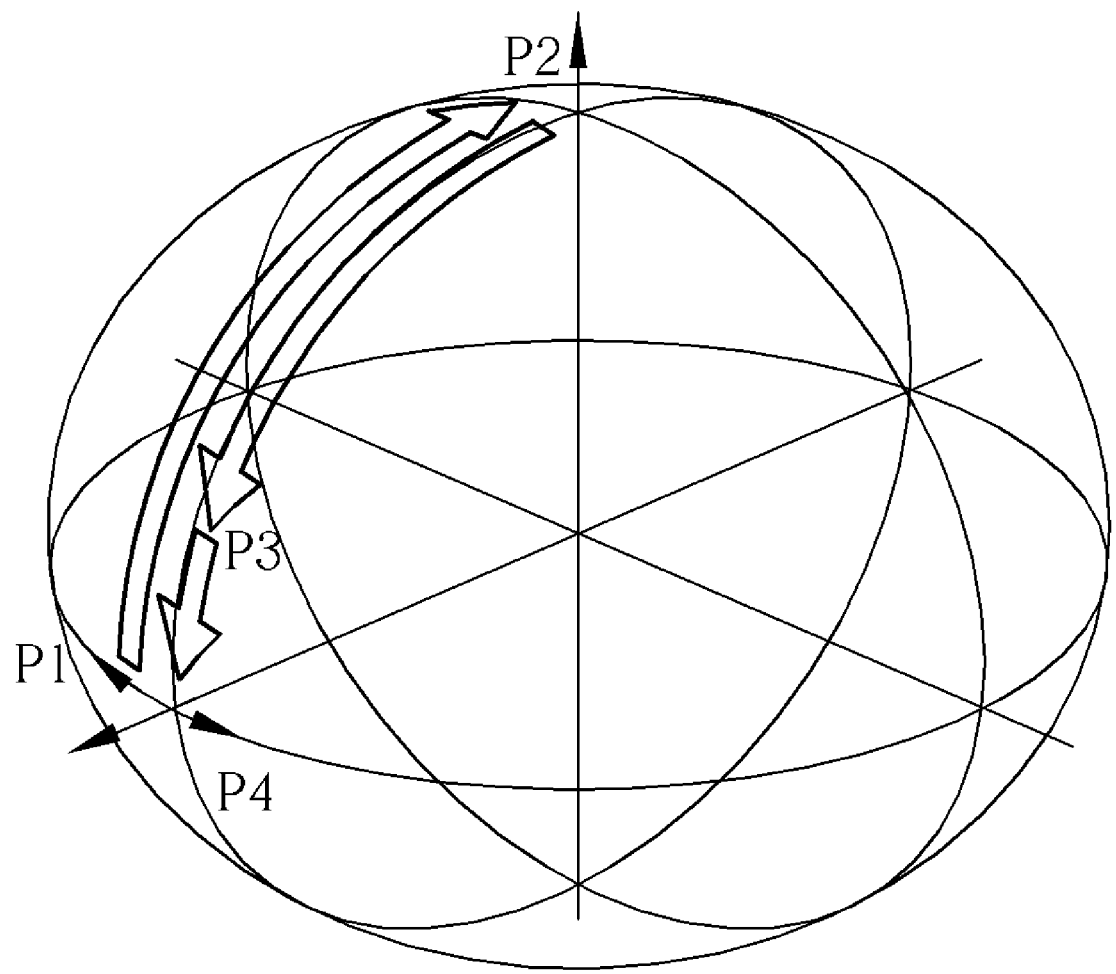
FIG. 6B is a poincare sphere illustrating the variation of light polarity of an LCD panel in the dark state.

Since the LCD panel 32 of the present embodiment is an ECB LCD panel, the LCD device 30 is a normally white LCD device. The type of the LCD device 30, however, is not limited, and may be other LCD devices suitable for the design of the present invention. In the present embodiment, the LCD panel 32 has a bright state and a dark state. By virtue of the aforementioned relative angle arrangement of the first transmissive axis 34T, the second transmissive axis 40T, the slow axis 36S of the quarter-wave retardation film 36, the slow axis 38S of the hybrid aligned nematic film 38, and the slow axis 32S of the LCD panel 32, in the bright state, the liquid crystal molecules 323 of the LCD panel 32 can be regarded as a half-wave plate, and the hybrid aligned nematic film 38 can be regarded as a quarter-wave retardation film. Conversely, in the dark state, both the liquid crystal molecules 323 of the LCD panel 32 and the hybrid aligned nematic film 38 can be regarded as quarter-wave retardation films. With reference to FIG. 5A to FIG. 6B, FIG. 5A is a schematic diagram illustrating the LCD panel of present embodiment in the bright state. FIG. 5B is a poincare sphere illustrating the variation of light polarity of an LCD panel in the bright state. FIG. 6A is a schematic diagram illustrating the LCD panel of the present embodiment in the dark state. FIG. 6B is a poincare sphere illustrating the variation of light polarity of an LCD panel in the dark state. As illustrated in FIG. 5A and FIG. 5B, in the bright state, the first quarter-wave retardation film 36 has a retardation of ¼ wavelength, and the hybrid aligned nematic film 38 has a retardation of ¼ wavelength, and the liquid crystal molecules 323 of the LCD panel 32 has a retardation of ½ wavelength. Consequently, the variation of light polarity can be expressed as follows:

The first stage P1: a natural light emitted from the backlight module 44 is transformed into a first linearly polarized light (parallel to the first transmissive axis 34T of the first polarizer 34) such as s-polarized light after penetrating through the first polarizer 34;

The second stage P2: the first linearly polarized light penetrating through the first quarter-wave retardation film 36 is transformed into a first circularly polarized light such as a left circularly polarized light;

The third stage P3: the first circularly polarized light penetrating through the hybrid aligned nematic film 38 with a retardation of ¼ wavelength is transformed into a first linearly polarized light;

The fourth stage P4: the first linearly polarized light penetrating through the liquid crystal molecules 323 is transformed into a second circularly polarized light such as a p-polarized light.

Since the second linearly polarized light is parallel to the second transmissive axis 40T of the second polarizer 40, the second linearly polarized light can penetrate through the second polarizer 40. Accordingly, the bright state can be displayed by the LCD device 30.

As illustrated in FIG. 6A and FIG. 6B, when a dark state voltage is applied, a major part of liquid crystal molecules 323 can be driven and rotated due to the electric field. However, the liquid crystal molecules 323 adjacent to the surfaces of the thin-film transistor substrate 321 and the color filter substrate 322 are not rotated and still arranged along the rubbing direction. As a result, the wavelength retardation of the liquid crystal molecules 323 is substantially smaller than ¼ wavelength, and the wavelength retardation of the hybrid aligned nematic film 38 can compensate for the wavelength retardation of the liquid crystal molecules 323. In other words, the sum of the wavelength retardation of the hybrid aligned nematic film 38 and the wavelength retardation of the liquid crystal molecules 323 is substantially up to ¼ wavelength. The variation of light polarity can be expressed as follows:

The first stage P1: a natural light emitted from the backlight module 44 is transformed into a first linearly polarized light after penetrating through the first polarizer 34;

The second stage P2: the first linearly polarized light penetrating through the first quarter-wave retardation film 36 is transformed into a first circularly polarized light;

The third stage P3: the first circularly polarized light penetrating through the hybrid aligned nematic film 38 is transformed into an elliptically polarized light;

The fourth stage P4: the elliptically polarized light penetrating through the liquid crystal molecules 323 is transformed into the first linearly polarized light.

Since the first linearly polarized light is perpendicular to the second transmissive axis 40T of the second polarizer 40, the first linearly polarized light can not penetrate through the second polarizer 40. Consequently, the dark state can be displayed by the LCD device 30.

Figure 7:
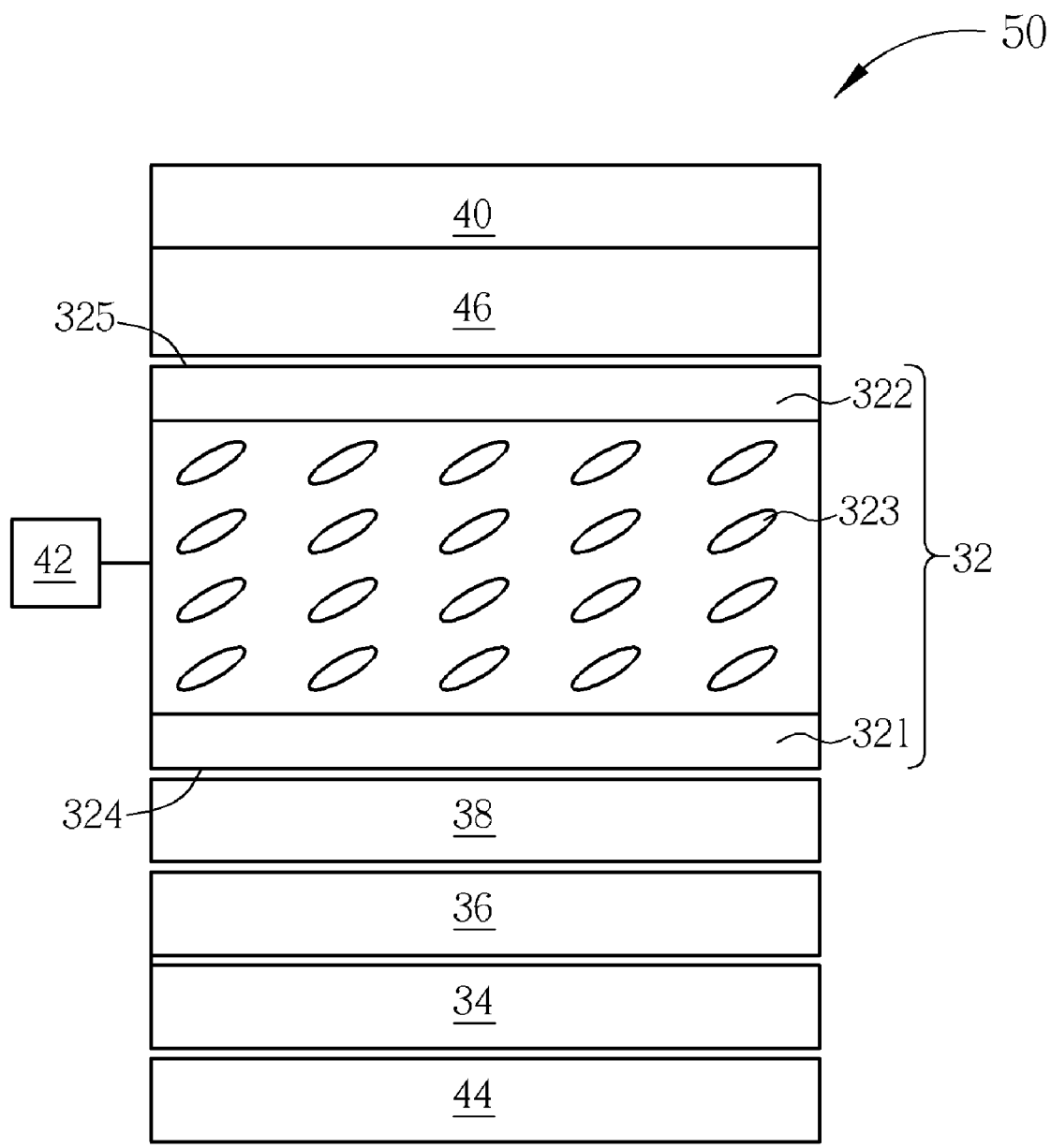
FIG. 7 is a cross-sectional schematic diagram illustrating the LCD device of the present embodiment.
Figure 8:
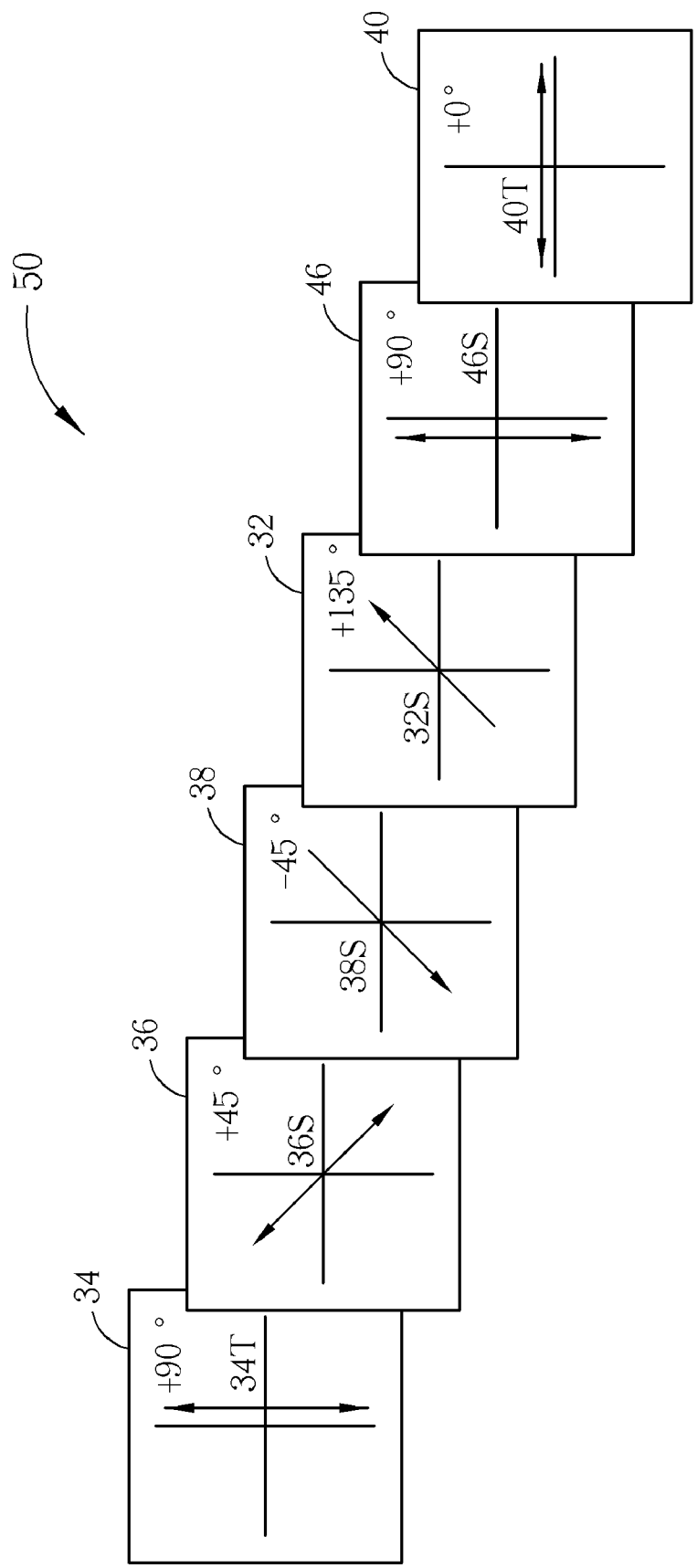
FIG. 8 is a schematic diagram illustrating the relationship of the slow axis or the transmissive axis direction of each of the films of the LCD device of the present embodiment.

With reference to FIG. 7 and FIG. 8, FIG. 7 and FIG. 8 are schematic diagrams illustrating the LCD device of another preferable embodiment of the present invention. FIG. 7 is a cross-sectional schematic diagram illustrating the LCD device of the present embodiment, and FIG. 8 is a schematic diagram illustrating the relationship of the slow axis or the transmissive axis direction of each of the films of the LCD device of the present embodiment. In order to compare the difference between the present embodiment and aforementioned embodiment, identical components are denoted by identical numerals. As illustrated in FIG. 7, being different from the LCD device 30 of aforementioned embodiment, the LCD device 50 of the present embodiment further includes a second quarter-wave retardation film 46 disposed between the second polarizer 40 and the LCD panel 32. As illustrated in FIG. 8, the slow axis 46S of the second quarter-wave retardation film 46 is substantially parallel to the first transmissive axis 34T of the first polarizer 34. However, the slow axis 46S of the second quarter-wave retardation film 46 may also be parallel to the second transmissive axis 40T of the second polarizer 40.

Figure 9:
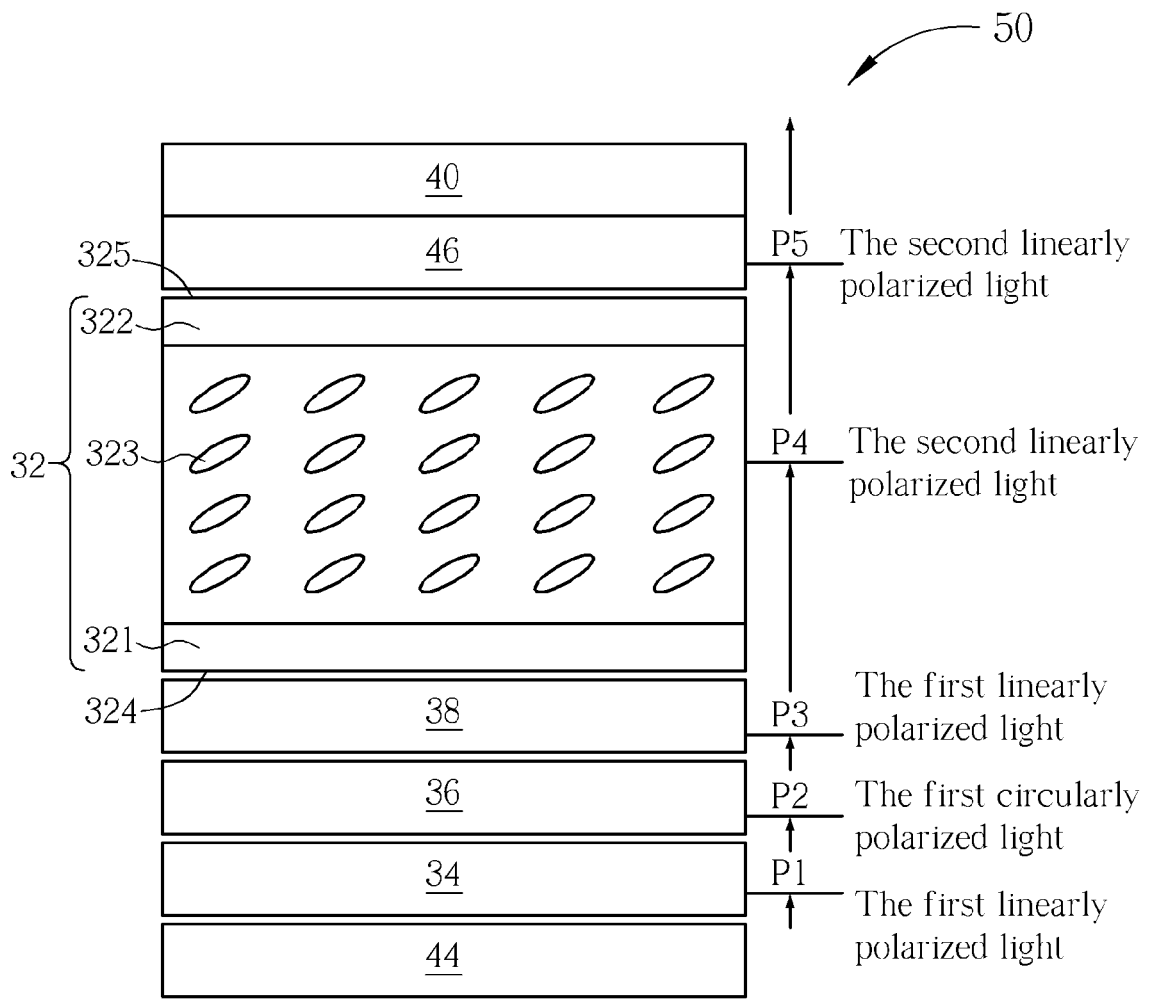
FIG. 9 is a schematic diagram illustrating the LCD panel of the present embodiment in the bright state
Figure 10:
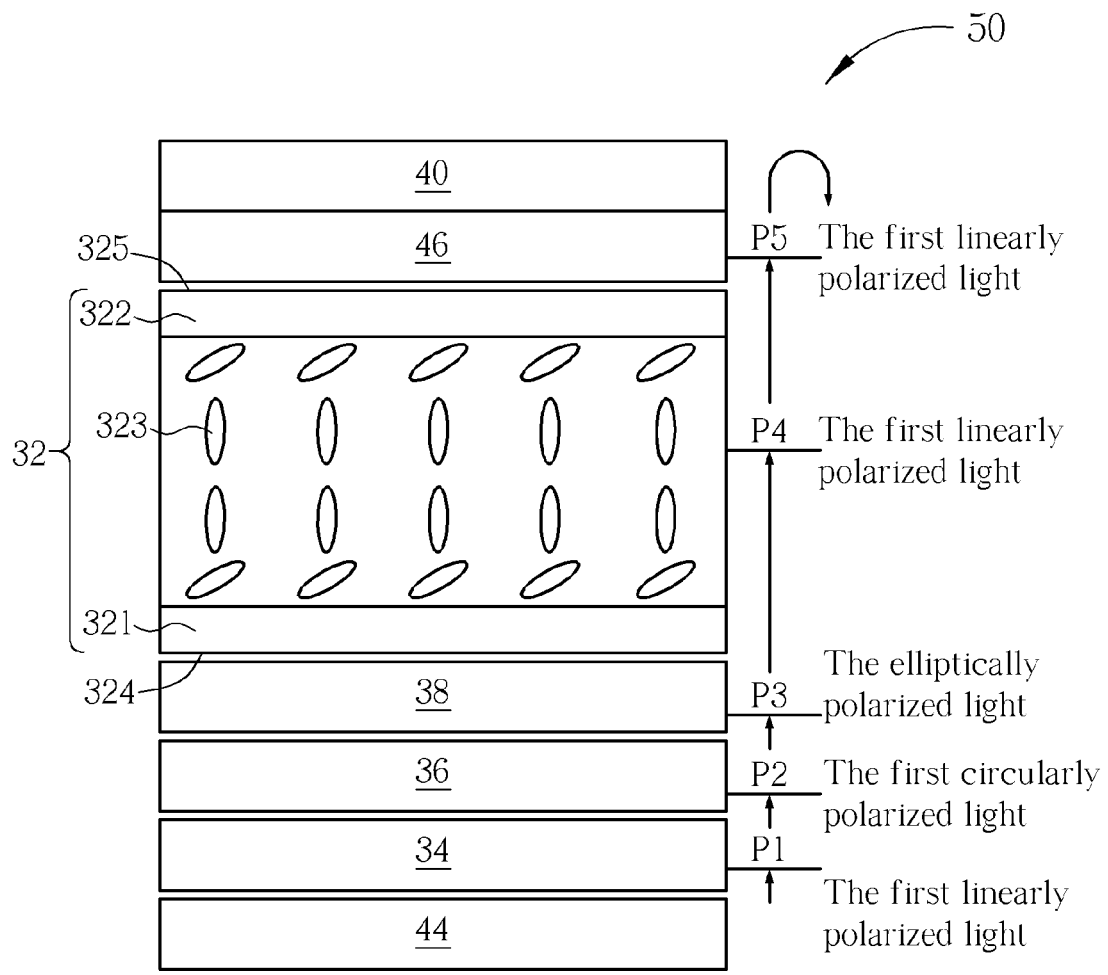
FIG. 10 is a schematic diagram illustrating the LCD panel of the present embodiment in the dark state.

With reference to FIG. 9 and FIG. 10, FIG. 9 is a schematic diagram illustrating the LCD panel of the present embodiment in the bright state, and FIG. 10 is a schematic diagram illustrating the LCD panel of the present embodiment in the dark state. As illustrated in FIG. 9, in the bright state, the first quarter-wave retardation film 36 has a retardation of ¼ wavelength, the hybrid aligned nematic film 38 has a retardation of ¼ wavelength, and the liquid crystal molecules 323 of the LCD panel 32 has a retardation of ½ wavelength. In addition, since the direction of the slow axis 46S of the second quarter-wave retardation film 46 is parallel to that of the first transmissive axis 34T of the first polarizer 34 or parallel to that of the second transmissive axis 40T of the second polarizer 40, the linearly polarized light accordingly has no retardation effect. The function of the second quarter-wave retardation film 46 is to reduce light leakage when viewed in the wide angle of LCD device 50 and further increase the contrast ratio. The variation of light polarity of the present embodiment can be expressed as follows:

The first stage P1: a natural light emitted from the backlight module 44 is transformed into a first linearly polarized light such as s-polarized light after penetrating through the first polarizer 34;

The second stage P2: the first linearly polarized light penetrating through the first quarter-wave retardation film 36 is transformed into a first circularly polarized light such as a left circularly polarized light;

The third stage P3: the first circularly polarized light penetrating through the hybrid aligned nematic film 38 is transformed into the first linearly polarized light;

The fourth stage P4: the first linearly polarized light penetrating through the liquid crystal molecules 323 is transformed into the second linearly polarized light such as p-polarized light;

The fifth stage P5: since the direction of the slow axis 46S of the second quarter-wave retardation film 46 is parallel to that of the first transmissive axis 34T of the first polarizer 34 or parallel to that of the second transmissive axis 40T of the second polarizer 40 (i.e. the direction of the slow axis 46S of the second quarter-wave retardation film 46 is parallel or perpendicular to the polarization direction of the second linearly polarized light), the polarization direction of the second linearly polarized light can accordingly not be changed.

Since the second linearly polarized light is parallel to the second transmissive axis 40T of the second polarizer 40, the second linearly polarized light can accordingly penetrate through the second polarizer 40. Consequently, the bright state can be displayed by the LCD device 50.

As illustrated in FIG. 10, when a dark voltage is applied, a major part of the liquid crystal molecules 323 can be driven and rotated due to the electric field. However, the liquid crystal molecules 323 adjacent to the surfaces of the thin-film transistor substrate 321 and the color filter substrate 322 are not rotated and still arranged along the rubbing direction. As a result, the wavelength retardation of the liquid crystal molecules 323 is substantially smaller than ¼ wavelength, and the wavelength retardation of the hybrid aligned nematic film 38 can compensate for the wavelength retardation of the liquid crystal molecules 323. Consequently, the sum of the wavelength retardation of the hybrid aligned nematic film 38 and the wavelength retardation of the liquid crystal molecules 323 is substantially up to ¼ wavelength. Accordingly, the variation of light polarity can be expressed as follows:

The first stage P1: a natural light emitted from the backlight module 44 is transformed into a first linearly polarized light after penetrating through the first polarizer 34;

The second stage P2: the first linearly polarized light penetrating through the first quarter-wave retardation film 36 is transformed into a first circularly polarized light;

The third stage P3: the first circularly polarized light penetrating through the hybrid aligned nematic film 38 is transformed into an elliptically polarized light;

The fourth stage P4: the elliptically polarized light penetrating through the liquid crystal molecules 323 is transformed into the first linearly polarized light;

The fifth stage P5: since the direction of the slow axis 46S of the second quarter-wave retardation film 46 is parallel to that of the first transmissive axis 34T of the first polarizer 34 or parallel to that of the second transmissive axis 40T of the second polarizer 40, the polarization direction of the first linearly polarized light can not be changed.

Since the first linearly polarized light is substantially perpendicular to the second transmissive axis 40T of the second polarizer 40, the first linearly polarized light accordingly can not penetrate through the second polarizer 40. Therefore, the dark state can be displayed by the LCD device 50.

From the aforementioned description we know, by virtue of the arrangement of the first quarter-wave retardation film and the hybrid aligned nematic film, the insufficient phase difference of the liquid crystal molecules in the dark state can be compensated, and undesired light leakage in the dark state can therefore be resolved. Additionally, by virtue of the second quarter-wave retardation film arrangement, the undesired light leakage when viewed in the wide angle can be further reduced. Furthermore, as above-mentioned description, since the lights with different wavelengths can have different phase difference when penetrating the liquid crystal molecules, the color washout problem occurs easily. To overcome the color washout problem, the present invention utilizes a multiple-gamma IC to respectively provide different gamma-curve signals for different color pixels of the display panel to solve the color washout.

Figure 11:
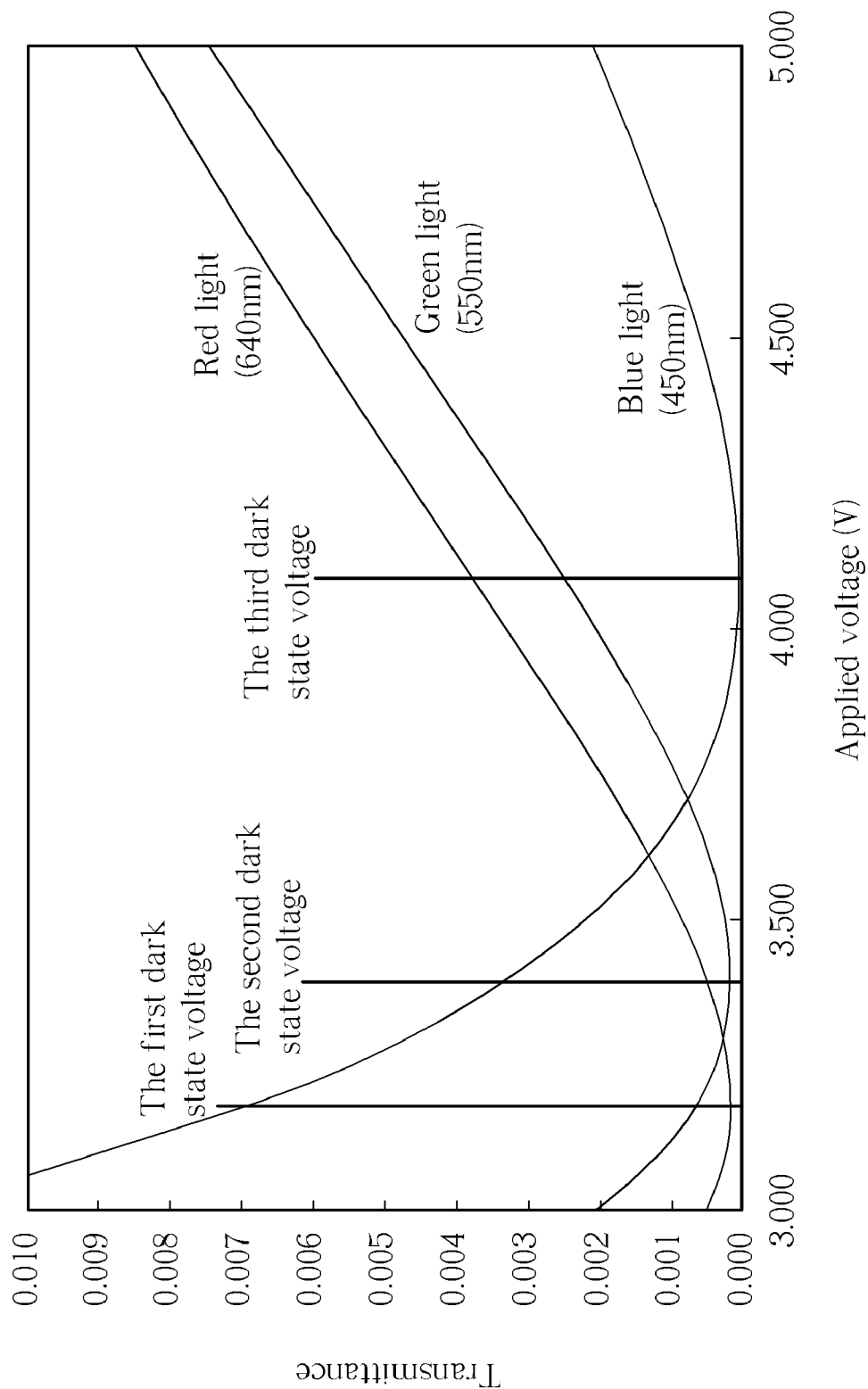
FIG. 11 is a relation diagram illustrating a voltage-transmittance characteristic curve of the LCD device of the present invention.

With reference to FIG. 11 and FIG. 3, FIG. 11 is a relation diagram illustrating a voltage-transmittance characteristic curve of the LCD device of the present invention. As illustrated in FIG. 11, the red, green and blue lights have different voltage-transmittance characteristic curves respectively. The dark state voltages of the red pixels 32R, green pixels 32G and blue pixels 32B are about 3.2V, 3.45V, and 4.1V, respectively. Under such condition, if only a fixed dark state voltage is used as a standard voltage such as the dark state voltage (about 3.2 V) of the red pixels 32R responsibly controlling all of the color pixels, obvious blue light leakage will appear due to the higher transmittance of blue light under such a dark state voltage. Therefore, the present invention utilizes the multiple-gamma IC 42 such as a 3-gamma IC to respectively provide different dark state voltages of the red pixels 32R, green pixels 32G, and blue pixels 32B according to the different voltage-transmittance characteristic curves of the red pixels 32R, green pixels 32G, and blue pixels 32B. For instance, the 3-gamma IC can provide a first dark state voltage, a second dark state voltage and a third dark state voltage for the red pixels 32R, the green pixels 32G, the blue pixels 32B, respectively. The first dark state voltage is smaller than the second dark state voltage, and the second dark state voltage is smaller than the third state voltage. Then, all the pixel regions in the dark state are actually in the darkest condition and have no color washout problem.

In summary, by virtue of the arrangement of the first quarter-wave retardation film, the hybrid aligned nematic film and the second quarter-wave retardation film, the undesired light leakage can be reduced so as to achieve a higher contrast ratio. Besides, the color washout problem can be successfully solved by using the multiple-gamma IC.

Those skilled in the art will readily observe that numerous modifications and alterations of the device and method may be made while retaining the teachings of the invention.

What is claimed is:

1. A liquid crystal display (LCD) device, comprising:
    an LCD panel having a light incident surface, a light emitting surface, and a slow axis;
    a first polarizer, disposed adjacent to the light incident surface of the LCD panel, having a first transmissive axis;
    a first quarter-wave retardation film, disposed between the LCD panel and the first polarizer, having a slow axis;
    a hybrid aligned nematic film, disposed between the LCD panel and the first quarter-wave retardation film, having a slow axis;
    a second polarizer, disposed on the light emitting surface of the LCD panel, having a second transmissive axis; and
    a multiple-gamma IC adapted to provide different gamma-curve signals to different color pixels of the LCD panel, respectively;
    wherein the first transmissive axis of the first polarizer is substantially perpendicular to the second transmissive axis of the second polarizer, the slow axis of the first quarter-wave retardation film is substantially perpendicular to the slow axis of the hybrid aligned nematic film, the slow axis of the hybrid aligned nematic film is substantially parallel to the slow axis of the LCD panel, and an included angle between the slow axis of the first quarter-wave retardation film and the first transmissive axis of the first polarizer is greater than 0° and smaller than 90°.

2. The LCD device of claim 1, wherein the LCD panel comprises an electrically controlled birefringence (ECB) LCD panel.

3. The LCD device of claim 1, wherein the LCD panel is a normally white LCD panel.

4. The LCD device of claim 1, wherein the LCD panel has a dark state, and a sum of a phase difference of the hybrid aligned nematic film and a phase difference of the LCD panel is about ¼ wavelength in the dark state.

5. The LCD device of claim 1, wherein the LCD panel has a bright state, and a phase difference of the LCD panel is about ½ wavelength in the bright state.

6. The LCD device of claim 1, wherein the included angle between the slow axis of the first quarter-wave retardation film and the first transmission axis of the first polarizer is about 45°.

7. The LCD device of claim 1, further comprising a second quarter-wave retardation film disposed between the second polarizer and the LCD panel.

8. The LCD device of claim 7, wherein the second quarter-wave retardation film has a slow axis substantially parallel to the first transmissive axis of the first polarizer.

9. The LCD device of claim 7, wherein the second quarter-wave retardation film has a slow axis substantially parallel to the second transmissive axis of the second polarizer.

10. The LCD device of claim 1, further comprising a backlight module disposed on a side of the first polarizer opposite to the LCD panel.

11. The LCD device of claim 1, wherein the LCD panel comprises a plurality of red pixels, green pixels and blue pixels, and wherein the multiple-gamma IC is a 3-gamma IC.

12. The LCD device of claim 11, wherein the LCD panel has a dark state, and wherein the 3-gamma IC provides a first dark state voltage, a second dark state voltage and a third dark state voltage for the red pixels, green pixels and blue pixels, respectively, in the dark state.

13. The LCD device of claim 12, wherein the first dark state voltage is smaller than the second dark state voltage and the second dark state voltage is smaller than the third dark state voltage.

* * * * *